(12) United States Patent
Gao et al.

(10) Patent No.: US 11,014,033 B2
(45) Date of Patent: May 25, 2021

(54) METHOD AND SYSTEM FOR REMOVING FINE PARTICULATES FROM AEROSOL

(71) Applicant: Jing Gao, Beijing (CN)

(72) Inventors: Jing Gao, Beijing (CN); Jiemin Wang, Beijing (CN); Fahe Chai, Beijing (CN); Yanping Li, Bejing (CN); Chuanfeng Zhao, Bejing (CN); Di Gao, Bejing (CN)

(73) Assignee: Jing Gao, Beijing (CN)

( * ) Notice: Subject to any disclaimer, the term of this patent is extended or adjusted under 35 U.S.C. 154(b) by 9 days.

(21) Appl. No.: 16/310,158

(22) PCT Filed: Jun. 9, 2017

(86) PCT No.: PCT/CN2017/087810
§ 371 (c)(1),
(2) Date: Dec. 14, 2018

(87) PCT Pub. No.: WO2017/215535
PCT Pub. Date: Dec. 21, 2017

(65) Prior Publication Data
US 2019/0176072 A1    Jun. 13, 2019

(30) Foreign Application Priority Data
Jun. 15, 2016    (CN) .......................... 201610424648.0

(51) Int. Cl.
*B01D 45/10*    (2006.01)
(52) U.S. Cl.
CPC .................................... *B01D 45/10* (2013.01)

(58) Field of Classification Search
CPC ....................................................... B01D 45/10
See application file for complete search history.

(56) References Cited

U.S. PATENT DOCUMENTS

| 1,603,878 | A | * | 10/1926 | Smith | .................... B01D 45/08 55/428 |
| 3,181,287 | A | * | 5/1965 | Rabson | .................. B01D 45/08 96/357 |

(Continued)

FOREIGN PATENT DOCUMENTS

| CN | 1663668 A | 7/2005 |
| CN | 101031673 A | 5/2007 |

(Continued)

*Primary Examiner* — Jonathan Miller
(74) *Attorney, Agent, or Firm* — Wiggin and Dana LLP; Gregory Rosenblatt; Jonathan D. Hall

(57) ABSTRACT

A system for removing fine particulate matter from an aerosol, which, using a fine particulate matter capture device (1) comprising sheet members (2) parallel to each other and an interferent (3) between the sheet members, causes the aerosol to form a turbulent flow in passages between the sheet members (2), settles fine particulate matter in the aerosol on the outer surfaces of the sheet members under the action of turbulent fluctuation, thermophoretic force and/or vapor pressure gradient force, and meanwhile forms a water film on the outer surfaces of the sheet members (2) to prevent settled particulate matter from being carried away again by an air flow. The system is able to effectively remove fine particulate matter from an aerosol, especially submicron particulate matter, and significantly reduce the number concentration thereof.

15 Claims, 4 Drawing Sheets

(56) References Cited

U.S. PATENT DOCUMENTS

| | | | | |
|---|---|---|---|---|
| 3,870,082 A | * | 3/1975 | Holl | B01D 47/10 138/40 |
| RE33,444 E | * | 11/1990 | Lerner | B01D 45/08 165/159 |
| 5,809,909 A | * | 9/1998 | Hoskinson | B01D 45/08 110/215 |
| 6,083,302 A | * | 7/2000 | Bauver, II | B01D 45/08 55/440 |
| 6,238,464 B1 | * | 5/2001 | Dullien | B01D 45/02 55/304 |
| 6,872,240 B2 | * | 3/2005 | Pellegrin | B01D 47/04 95/150 |
| 7,563,312 B2 | * | 7/2009 | Wascher | B01D 45/02 96/274 |
| 8,696,780 B2 | * | 4/2014 | Bichl | B01D 45/10 55/484 |
| 2008/0063558 A1 | * | 3/2008 | Coleman | B01D 45/10 422/4 |

FOREIGN PATENT DOCUMENTS

| | | | | |
|---|---|---|---|---|
| CN | 105920960 A | | 7/2016 | |
| GB | 277281 A | * | 12/1927 | B01D 45/10 |

\* cited by examiner

METHOD AND SYSTEM FOR REMOVING FINE PARTICULATES FROM AEROSOL

TECHNICAL FIELD

The present disclosure relates to the fields of industrial waste gas and air purification, particularly to a method and a system for removing fine particulate matter, such as especially sub-micron particulate matter, from aerosols, especially from wet aerosols.

BACKGROUND

Aerosol refers to the colloidal dispersion system formed by solid or liquid particulate matter dispersed and suspended in a gas medium, also known as a gas dispersion system. The solid or liquid particulate matter of aerosols are generally with a diameter of 0.001~100 μm (micrometers). The number of particulate matter has a greater impact on the human health, ecology, weather, climate and others than the mass of particulate matter, so the aerosol concentration is usually calculated based on the number of particulate matter per unit volume in many studies, the number concentration for short.

Specific examples of aerosols include cloud, fog and dust in the sky, flue gas formed by unburned fuels in boilers and various engines used in industry and transportation, waste gas containing solid dust formed in mining, quarry grinding and grain processing, artificial masking smoke and toxic smoke, etc.

When the aerosols accumulate in the air and make the atmospheric visibility less than 10 km, the phenomenon is called haze. Note that the particles forming the haze events are generally dry aerosols. However, when the visibility is 1 to 10 km, there may be the effect of both dry aerosols (i.e., the effect of haze) and liquid droplets (i.e., the contribution of fog), which are difficult to identify and generally called as "fog and haze" phenomenon. Noting that the formation of fog needs aerosols to serve as cloud condensation nuclei or ice nulei, both the fog and haze are highly related to aerosol particles.

Fine particulate matter (PM2.5) refers to solid particulate matter or droplets with an aerodynamic equivalent diameter less than or equal to 2.5 microns in the ambient air. Although the mass content of PM2.5 in atmospheric composition is very low, PM2.5 has serious impacts on air quality, visibility, etc. Compared with larger atmospheric particulate matter, PM2.5 has a small diameter, a large total cross area and a strong activity, tends to carry toxic and harmful substances (e.g., heavy metals, microorganisms, etc.), has a long residence time in the atmosphere and a long transport distance, and therefore has a greater impact on human health and atmospheric environment quality.

Sub-micron particulate matter (PM1) refers to solid particulate matter or droplets with an aerodynamic equivalent diameter less than or equal to 1 μm in the ambient air. PM1 has a small diameter, is rich in toxic and harmful substances, has a long residence time in the atmosphere and a long transport distance, and thus has a greater impact on human health and atmospheric environment quality. PM2.5 can enter human lungs, and PM1 can even enter human blood. The mass ratio of PM1 in PM2.5 is not high, but the number concentration ratio is close to 90%.

A large amount of wet aerosol (with a relative humidity above 80%) is generated in industrial production, and such aerosol contains a certain amount of fine particulate matter such as fine dust, condensable particulate matter, small droplets, etc. Conventional wet dust collectors mostly cause dust-containing gas to closely contact liquid (usually water), and particulate matter are enlarged or left in a fixed container to achieve separation of water and dust by way of inertial collision of water droplets and particulate matter or sufficient mixing of water and dust. Practical applications show that such technology has a rather good effect on removing coarse particulate matter from the high-humidity environment, but has a poor effect on removing fine particulate matter therefrom, so it fails to meet the increasingly rigid environmental protection requirements.

At present, the main technologies for removing fine particulate matter in exhaust gas are bag-type and electrostatic dust removal techniques, wherein the former is more efficient than the latter. When the bag-type dust removal technology is applied to high-humidity aerosols, the dust layer is easily hardened after absorbing water, which affects normal dust removal and continuous operation. One of the most well-known electrostatic dust removal technologies is wet electric dust removal technique, which can be used for treating high-humidity aerosols. For recent years, some enterprises have begun to apply wet electric dust collectors to remove dust from high-humidity aerosols, of which the removal efficiency can reach about 70% by mass concentration. However, since particles with a smaller particle diameter are more difficult to charge as limited by the charging mechanism, the efficiency by number concentration of removing sub-micron particles from wet aerosols is low. Moreover, the manufacturing and operating costs are high, and equipment corrosion occurs frequently. Thus, both the bag-type and electrostatic dust removal techniques are difficult to promote.

SUMMARY

The object of the present disclosure is to provide a system and a method capable of efficiently removing fine particulate matter, especially sub-micron particulate matter, from aerosols.

According to an aspect of the present disclosure, provided is a method for removing fine particulate matter from aerosols, comprising: passing an aerosol through a fine particulate matter capture device which comprises at least two sheet members and an interferent between the sheet members, the sheet members being substantially parallel to each other and substantially parallel to the flowing direction of the aerosol, and passages being formed between adjacent sheet members to cause the aerosol to form a turbulent flow between the passages; forming a water film on outer surfaces of the sheet members; and thereby causing the fine particulate matter to settle on the outer surfaces of the sheet members and to be removed by flowing of the water film.

In some embodiments, the ratio of the spacing between adjacent sheet members to the length of the sheet members in the flowing direction of the aerosol is less than 4 times the turbulence intensity. In a preferred embodiment, the ratio of the spacing between adjacent sheet members to the length of the sheet members in the flowing direction of the aerosol is less than 2 times the turbulence intensity.

In some embodiments, the relative humidity of the aerosol is 60% or more. In a preferred embodiment, the relative humidity of the aerosol is saturated, nearly saturated or supersaturated.

In some embodiments, the temperature of the outer surfaces of the sheet members is 2° C. or more below the temperature of the aerosol. In a preferred embodiment, the temperature of the outer surfaces of the sheet members is 5° C. or more below the temperature of the aerosol. In a more preferred embodiment, the temperature of the outer surfaces of the sheet members is 10° C. or more below the temperature of the aerosol.

In some preferred embodiments, the interferent is a hollow tube penetrating through the sheet members, and a coolant flows through the tube to maintain the temperature difference between the outer surfaces of the sheet members and the aerosol. The coolant may be one of or a mixture of water, Freon, methanol, ethanol, acetone, ammonia water and other liquid.

In a preferred embodiment, the fine particulate matter capture device is a finned tube heat exchanger, fins on the heat exchanger constitute the sheet members, and a base tube of the heat exchanger constitutes the interferent. In some embodiments, the finned tube heat exchanger is a conventional tubular heat exchanger. The finned tube heat exchanger is more preferably a finned heat pipe heat exchanger.

In other preferred embodiments, the interferent is a heat-conducting solid tube penetrating through the sheet members, the solid tube is connected to an external cold source, and the temperature difference between the sheet members and the aerosol is formed through heat conduction.

In some embodiments, the fine particulate matter capture device is made of a metal material, such as one or more of aluminum, copper and steel.

In a preferred embodiment, the metal members of steel, copper or aluminum in the fine particulate matter capture device are coated with an anti-corrosive material or passivated.

In other preferred embodiments, the sheet members are semiconductor thermoelectric sheets, and the fine particulate matter capture device includes two semiconductor thermoelectric sheets having opposite cold ends and an interferent between the thermoelectric sheets. The aerosol forms a turbulent flow in a passage between the cold ends of the two semiconductor thermoelectric sheets.

In some embodiments, the temperature of the outer surfaces of the sheet members is lower than the temperature of the aerosol so that moisture in the aerosol condenses to form a water film on the outer surfaces of the sheet members.

In other embodiments, water or a water solution is sprayed onto the outer surfaces of the sheet members to form a water film thereon.

In some embodiments, the fine particulate matter capture device is a set of fine particulate matter capture devices arranged in parallel on a cross section of the flowing direction of the aerosol.

In some embodiments, the fine particulate matter capture device is a plurality of sets of fine particulate matter capture devices arranged in the flowing direction of the aerosol, each set of fine particulate matter capture devices being arranged in parallel on a cross section of the flowing direction of the aerosol. Two adjacent sets of fine particulate matter capture devices can be staggered or sequentially arranged.

In some embodiments, after the aerosol passes through the fine particulate matter capture device, large-particle-sized liquid droplet particulate matter are further removed using another particulate matter capture device, such as a mist eliminator or a dust collector.

In some embodiments, the aerosol is pretreated before passing through the fine particulate matter capture device to improve the relative humidity thereof.

In some embodiments, the velocity of the aerosol between the sheet members is preferably 2 to 20 m/s.

In the present disclosure, the aerosol includes, but is not limited to, high-humidity flue gas, particularly high-humidity flue gas treated by wet desulfurization.

According to another aspect of the present disclosure, provided is a system for removing fine particulate matter from an aerosol, comprising: an air flow passage for the aerosol to flow, wherein a fine particulate matter capture device is provided in the air flow passage, the fine particulate matter capture device comprises at least two sheet members and an interferent between the sheet members, and the sheet members are substantially parallel to each other and substantially parallel to the direction of air flow.

In some embodiments, the ratio of the spacing between adjacent sheet members to the length of the sheet members in the flowing direction of the aerosol is less than 4 times the turbulence intensity. In a preferred embodiment, the ratio of the spacing between the adjacent sheet members to the length of the sheet members in the flowing direction of the aerosol is less than 2 times the turbulence intensity.

In some preferred embodiments, the interferent is a hollow tube penetrating through the sheet members, and a coolant flows through the tube to maintain the temperature difference between the outer surfaces of the sheet members and the aerosol. The coolant may be one of or a mixture of water, Freon, methanol, ethanol, acetone, ammonia water and other liquid. In a preferred embodiment, the fine particulate matter capture device is a finned tube heat exchanger, fins on the heat exchanger constitute the sheet members, and a base tube of the heat exchanger constitutes the interferent. The finned tube heat exchanger may be a conventional pipe heat exchanger, preferably a finned heat pipe heat exchanger, more preferably a separate heat pipe heat exchanger.

In other preferred embodiments, the interferent is a heat-conducting solid tube penetrating through the sheet members, the solid tube is connected to an external cold source, and the temperature difference between the sheet members and the aerosol is formed through heat conduction.

In some embodiments, the fine particulate matter capture device is made of a metal material, such as one of or a compound of two or more of aluminum, copper and steel.

In a preferred embodiment, the metal members of steel, copper or aluminum in the fine particulate matter capture device are coated with an anti-corrosive material or passivated.

In other preferred embodiments, the sheet members are semiconductor thermoelectric sheets, and the fine particulate matter capture device includes two semiconductor thermoelectric sheets having opposite cold ends and an interferent between the thermoelectric sheets.

In some embodiments, a spray device is provided at one or two sides of the fine particulate matter capture device to spray water or a water solution onto the outer surfaces of the sheet members.

In some embodiments, the fine particulate matter capture device is a set of fine particulate matter capture devices arranged in parallel on a cross section of the air flow passage.

In some embodiments, the fine particulate matter capture device is a plurality of sets of fine particulate matter capture devices arranged along the air flow passage, each set of fine particulate matter capture devices being arranged in parallel on a cross section of the air flow passage. Two adjacent sets of fine particulate matter capture devices can be staggered or sequentially arranged.

In some embodiments, another particulate matter capture device, such as a mist eliminator or a dust collector, is provided following the fine particulate matter capture device in the air flow passage.

In some embodiments, a pretreatment device for improving the relative humidity of the aerosol is provided before the fine particulate matter capture device in the air flow passage.

According to the present disclosure, a high-humidity aerosol is treated using a fine particulate matter capture device having a structure beneficial to forming a turbulent flow, and the turbulent fluctuation can cause fine particulate matter to collide and settle between parallel walls; in addition, when metal sheet members with strong heat conductivity are used as a cooler, a large temperature gradient can be formed between the surfaces of the fins and the aerosol, and the fine particulate matter are driven by thermophoretic force to move to the surfaces of the fins; moreover, the high-humidity aerosol is cooled to condense water vapor, and some vapor pressure gradient difference is produced in the aerosol to form a vapor pressure gradient force, which further drives the fine particulate matter to move to the surfaces of the fins; and at the same time, a water film is formed on the outer surfaces of the finned tube to prevent the settled particulate matter from being carried by the air flow once more.

After the aerosol is cooled by the fine particulate matter capture device, a certain degree of vapor supersaturation is formed, the particulate matter escaping from the aerosol, acting as condensation nuclei in the supersaturated wet aerosol, is surrounded by condensed water and grows large enough to be further removed in a following particulate matter capture device such as a mist eliminator, a wet electric dust collector, a venturi dust collector, etc. Thereby, fine particulate matter can be efficiently removed from the high-humidity aerosol, and exhaust gas and air in the industries of power, steel, chemicals, wood processing and the like can be purified.

Specifically, the present disclosure relates to the following solutions:

Solution 1: A method for removing fine particulate matter from an aerosol, comprising: passing an aerosol through a fine particulate matter capture device which comprises at least two sheet members and an interferent between the sheet members, the sheet members being substantially parallel to each other and substantially parallel to the flowing direction of the aerosol, and passages being formed between adjacent sheet members to cause the aerosol to form a turbulent flow between the passages; forming a water film on the outer surfaces of the sheet members; and thereby causing the fine particulate matter to settle on the outer surfaces of the sheet members and to be removed by flowing of the water film.

Solution 2: The method of solution 1, wherein the ratio of the spacing between adjacent sheet members to the length of the sheet members in the flowing direction of the aerosol is less than 4 times the turbulence intensity.

Solution 3: The method of solution 1 or 2, wherein the relative humidity of the aerosol is 60% or more.

Solution 4: The method of solution 3, wherein the relative humidity of the aerosol is saturated, nearly saturated or supersaturated.

Solution 5: The method of one of solutions 1-4, wherein the temperature of the outer surfaces of the sheet members is 2° C. or more below the temperature of the aerosol.

Solution 6: The method of solution 5, wherein the temperature of the outer surfaces of the sheet members is 5° C. or more below the temperature of the aerosol.

Solution 7: The method of one of solutions 1-6, wherein the interferent is a hollow tube penetrating through the sheet members, and a coolant flows through the tube to maintain the temperature difference between the outer surfaces of the sheet members and the aerosol.

Solution 8: The method of solution 7, wherein the coolant is one of or a mixture of water, Freon, methanol, ethanol, acetone, ammonia water and other liquid.

Solution 9: The method of solution 7 or 8, wherein the fine particulate matter capture device is a finned tube heat exchanger, fins on the heat exchanger constitute the sheet members, and a base tube of the heat exchanger constitutes the interferent.

Solution 10: The method of solution 9, wherein the finned tube heat exchanger is a finned heat pipe heat exchanger.

Solution 11: The method of one of solutions 1-6, wherein the interferent is a heat-conducting solid tube penetrating through the sheet members, the solid tube is connected to an external cold source, and the temperature difference between the sheet members and the aerosol is formed through heat conduction.

Solution 12: The method of one of solutions 7-11, wherein the fine particulate matter capture device is made of a metal material.

Solution 13: The method of solution 12, wherein the metal members of steel, copper or aluminum in the fine particulate matter capture device are coated with an anti-corrosive material or passivated.

Solution 14: The method of one of solutions 1-6, wherein the sheet members are semiconductor thermoelectric sheets, the fine particulate matter capture device includes two semiconductor thermoelectric sheets having opposite cold ends and an interferent between the thermoelectric sheets, and the aerosol forms a turbulent flow in the passage between the cold ends of the two semiconductor thermoelectric sheets.

Solution 15: The method of one of solutions 1-14, wherein the temperature of the outer surfaces of the sheet members is lower than the temperature of the aerosol so that moisture in the aerosol condenses to form a water film on the outer surfaces of the sheet members.

Solution 16: The method of one of solutions 1-14, wherein water or a water solution is sprayed onto the outer surfaces of the sheet members to form a water film thereon.

Solution 17: The method of one of solutions 1-16, wherein the fine particulate matter capture device is a set of fine particulate matter capture devices arranged in parallel on a cross section of the flowing direction of the aerosol.

Solution 18: The method of one of solutions 1-16, wherein the fine particulate matter capture device is a plurality of sets of fine particulate matter capture devices arranged in the flowing direction of the aerosol, each set of fine particulate matter capture devices being arranged in parallel on a cross section of the flowing direction of the aerosol.

Solution 19: The method of solution 18, wherein two adjacent sets of fine particulate matter capture devices are staggered or sequentially arranged.

Solution 20: The method of one of solutions 1-19, wherein after the aerosol passes through the fine particulate matter capture device, large-particle-sized liquid droplet particulate matter are further removed using another particulate matter capture device.

Solution 21: The method of solution 20, wherein the other particulate matter capture device is a mist eliminator or a dust collector.

Solution 22: The method of one of solutions 1-21, wherein the aerosol is pretreated before passing through the fine particulate matter capture device to improve the relative humidity thereof.

Solution 23: The method of one of solutions 1-22, wherein the velocity of the aerosol between the sheet members is 2-20 m/s.

Solution 24: A system for removing fine particulate matter from an aerosol, comprising: an air flow passage for the aerosol to flow, wherein a fine particulate matter capture device is provided in the air flow passage, the fine particulate matter capture device comprises at least two sheet members and an interferent between the sheet members, and the sheet members are substantially parallel to each other and substantially parallel to the direction of air flow.

Solution 25: The system of solution 24, wherein the ratio of the spacing between adjacent sheet members to the length of the sheet members in the flowing direction of the aerosol is less than 4 times the turbulence intensity.

Solution 26: The system of solution 24 or 25, wherein the interferent is a hollow tube penetrating through the sheet members, and a coolant flows through the tube to maintain the temperature difference between the outer surfaces of the sheet members and the aerosol.

Solution 27: The system of solution 26, wherein the coolant is one of or a mixture of water, Freon, methanol, ethanol, acetone, ammonia water and other liquid.

Solution 28: The system of solution 26 or 27, wherein the fine particulate matter capture device is a finned tube heat exchanger, fins on the heat exchanger constitute the sheet members, and a base tube of the heat exchanger constitutes the interferent.

Solution 29: The system of solution 28, wherein the finned tube heat exchanger is a finned heat pipe heat exchanger.

Solution 30: The system of solution 29, wherein the heat pipe heat exchanger is a separate heat pipe heat exchanger.

Solution 31: The system of solution 24 or 25, wherein the interferent is a heat-conducting solid tube penetrating through the sheet members, the solid tube is connected to an external cold source, and the temperature difference between the sheet members and the aerosol is formed through heat conduction.

Solution 32: The system of one of solutions 26-31, wherein the fine particulate matter capture device is made of a metal material.

Solution 33: The system of solution 32, wherein the metal members of steel, copper or aluminum in the fine particulate matter capture device are coated with an anti-corrosive material or passivated.

Solution 34: The system of solution 24 or 25, wherein the sheet members are semiconductor thermoelectric sheets, and the fine particulate matter capture device includes two semiconductor thermoelectric sheets having opposite cold ends and an interferent between the thermoelectric sheets.

Solution 35: The system of one of solutions 24-34, wherein a spray device is arranged at one or two sides of the fine particulate matter capture device to spray water or a water solution onto the outer surfaces of the sheet members.

Solution 36: The system of one of solutions 24-35, wherein the fine particulate matter capture device is a set of fine particulate matter capture devices arranged in parallel on a cross section of the air flow passage.

Solution 37: The system of one of solutions 24-35, wherein the fine particulate matter capture device is a plurality of sets of fine particulate matter capture devices arranged along the air flow passage, each set of fine particulate matter capture devices being arranged in parallel on a cross section of the air flow passage.

Solution 38: The system of solution 37, wherein two adjacent sets of fine particulate matter capture devices are staggered or sequentially arranged.

Solution 39: The system of one of solutions 24-38, wherein another particulate matter capture device is provided following the fine particulate matter capture device in the air flow passage.

Solution 40: The system of solution 39, wherein the other particulate matter capture device is a mist eliminator or a dust collector.

Solution 41: The system of one of solutions 24-40, wherein a pretreatment device for improving the relative humidity of the aerosol is provided before the fine particulate matter capture device in the air flow passage.

BRIEF DESCRIPTION OF THE DRAWINGS

FIG. 1 is a schematic illustration of a method for removing fine particulate matter from a high-humidity aerosol according to the present disclosure.

FIG. 2 is a structure illustration of a fine particulate matter capture device using thermoelectric sheets as sheet members.

Figures 3, 4:
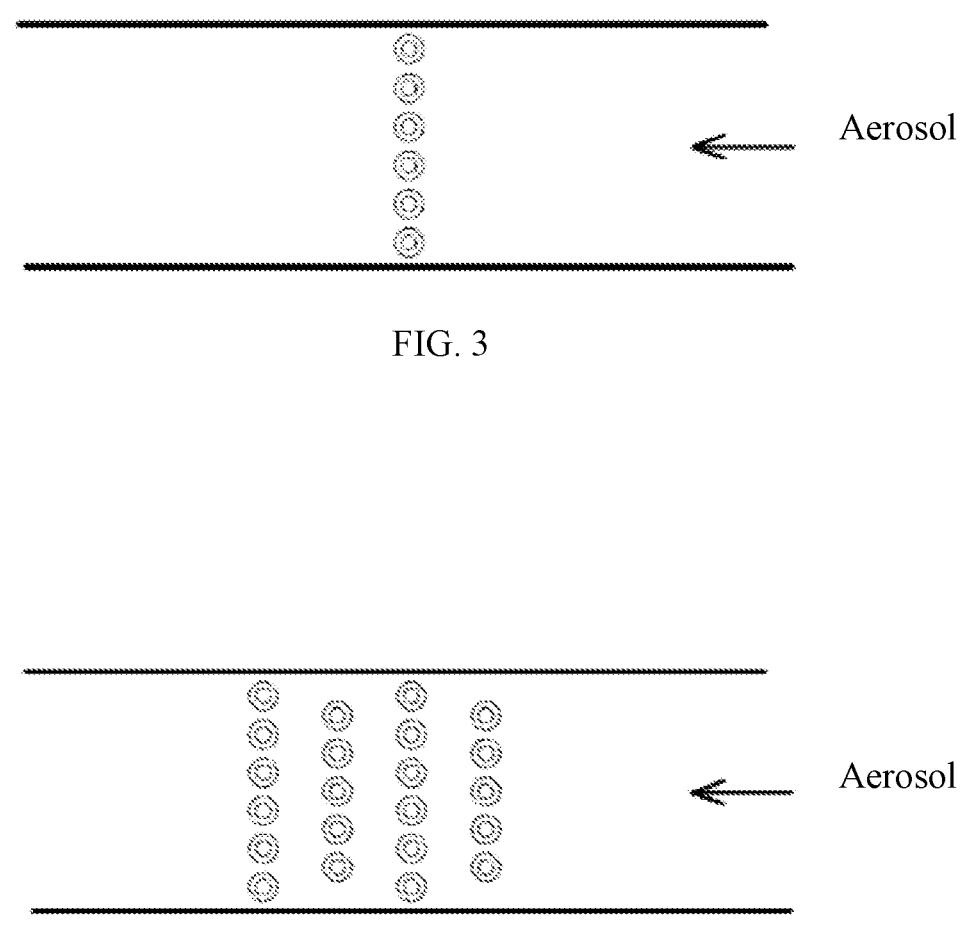

FIG. 3 is a schematic illustration of arrangement of a set of fine particulate matter capture devices.

FIG. 4 is a schematic illustration of arrangement of a plurality of sets of fine particulate matter capture devices.

Figures 5, 6:
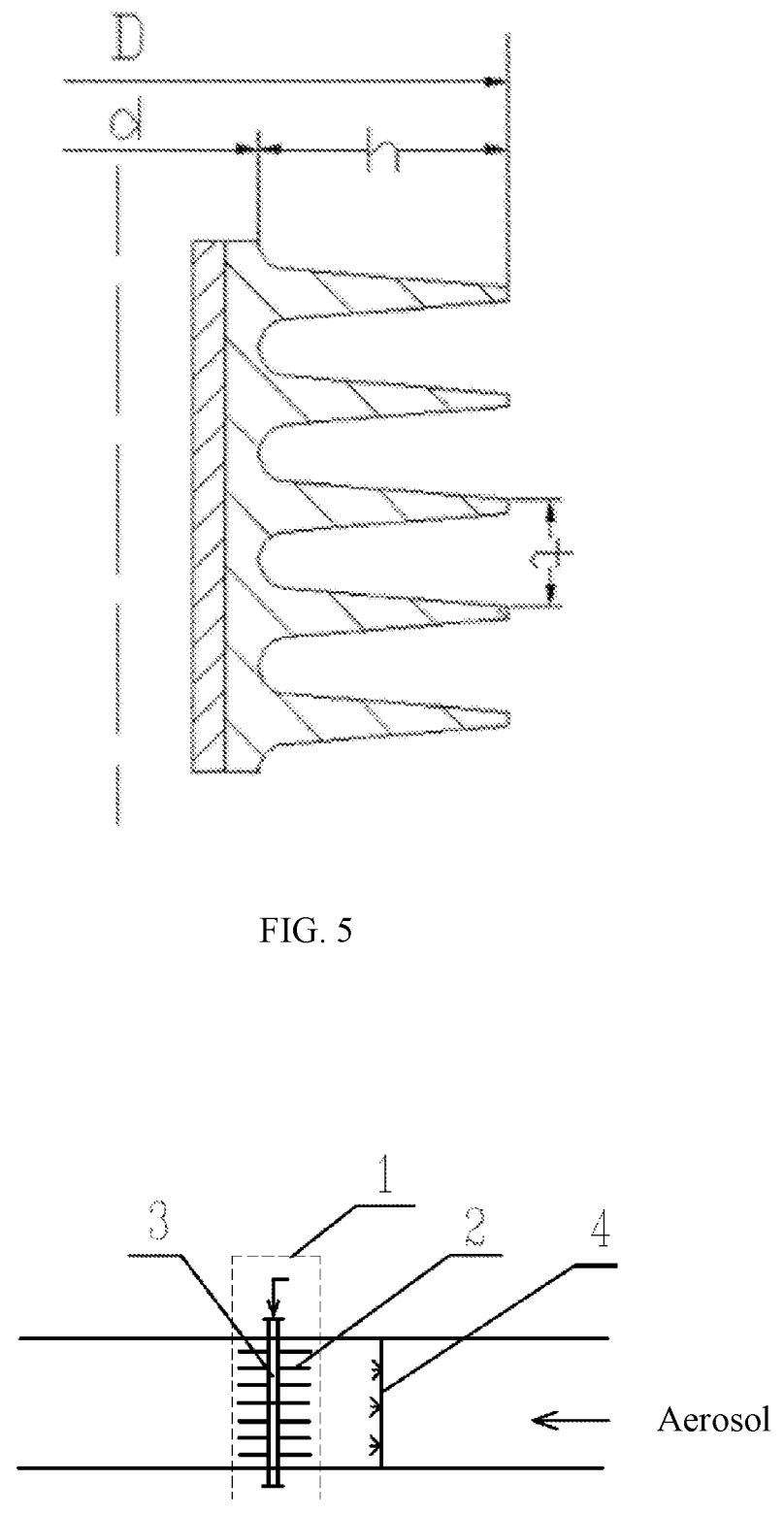

FIG. 5 is a structure illustration of a finned tube heat exchanger.

FIG. 6 is another schematic illustration of a method for removing fine particulate matter from a high-humidity aerosol according to the present disclosure.

FIG. 7 is another schematic illustration of a method for removing fine particulate matter from a high-humidity aerosol according to the present disclosure.

FIG. 8 is another schematic illustration of a method for removing fine particulate matter from a high-humidity aerosol according to the present disclosure.

DETAILED DESCRIPTION

In order to make the objectives, technical solutions and advantages of the present disclosure clearer, the following further describes the present disclosure in detail in combination with specific embodiments and the accompanying drawings. It should be understood that these descriptions are only exemplary, not intended to limit the scope of the present disclosure. In addition, descriptions on well-known structures and technologies are omitted below in order to avoid unnecessarily obscuring the concept of the present disclosure.

According to the mechanical analysis on aerosols, when the particle size is no more than 10 μm, the force associated with the inertial migration of particles is generally smaller than the viscous drag, and the particles' following behaviors in the gas are so good that it is difficult to separate the particles. According to the present disclosure, fine particulate matter are settled on the wall by means of turbulent fluctuation and/or thermophoretic force, vapor pressure gradient and other microscopic forces in small space scales, and then carried away by a water film on the wall, so as to achieve the effect of removing the fine particulate matter.

Figures 1, 2:
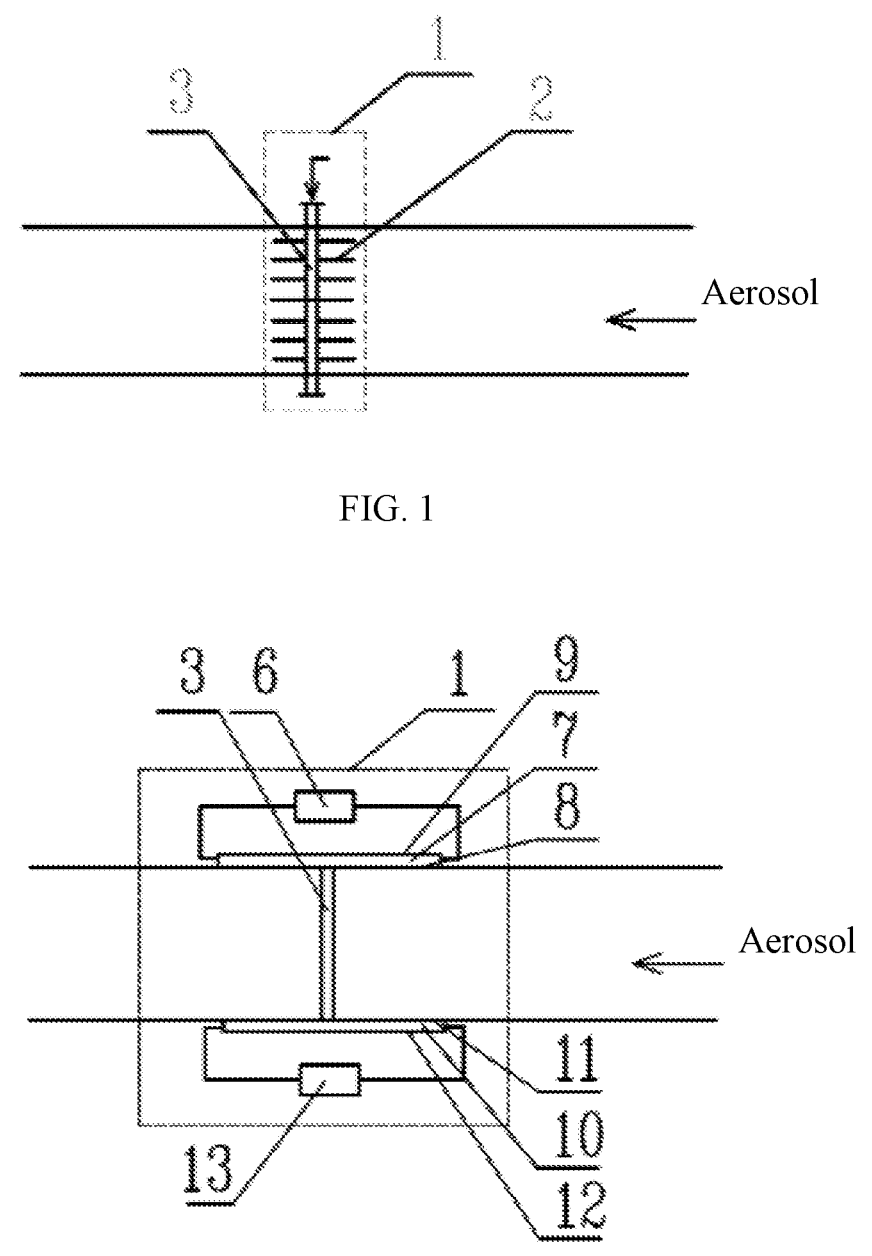

As shown in FIG. 1, a method for removing fine particulate matter from an aerosol in the present disclosure comprises: passing an aerosol through a fine particulate matter capture device 1 comprising at least two sheet members 2 and an interferent 3 between the sheet members, the sheet members being substantially parallel to each other and substantially parallel to the flowing direction of the high-humidity aerosol, and passages being formed between the adjacent sheet members to cause the aerosol to form a turbulent flow between the passages; forming a water film on the outer surfaces of the sheet members; and thereby causing the fine particulate matter to settle on the outer surfaces of the sheet members and to be removed by flowing of the water film.

The following theory can be used to explain the present disclosure.

On the one hand, when the aerosol forms a turbulent flow in the passages formed by the sheet members parallel to each other, the turbulent fluctuation may cause fine particulate matter to collide and settle between the outer surfaces of the sheet members and strengthen the settlement of the fine particulate matter onto the outer surfaces of the sheet members. The water film on the outer surfaces of the sheet members produces an adsorption force on the settled fine particulate matter, so that the settled fine particulate matter are prevented from being carried away by the high-humidity aerosol once more, and the fine particulate matter can be discharged by flowing of the water film.

A turbulent flow, also known as turbulence, is an irregular flow phenomenon, wherein after the velocity of a fluid in a flow passage increases to a certain value, the flow state of the fluid changes from laminar flow to turbulent flow. Whether the flowing gas is laminar or turbulent is usually determined by its Reynolds number (Re). The Reynolds number is a dimensionless ratio of the inertial force to the viscous force of the fluid under the flowing condition. The Reynolds number can characterize the flow characteristic (i.e., laminar or turbulent flow) of the fluid. The calculation of the Reynolds number and the determination of the flow state of the fluid are included in the technologies known by those skilled in the art.

The calculation formula of the Reynolds number Re is:

$$Re = \frac{\rho v L}{\mu}$$

In which: $\rho$ is the density of the fluid, v is the velocity of the fluid, $\mu$ is the viscosity of the fluid, and L is the characteristic length.

The term "characteristic length" is well known by those skilled in the art. For example, when gas flows through a circular tube, the term "characteristic length" is an equivalent diameter of the tube. When fluid flows through a flat plate, the term "characteristic length" is the distance of flowing backward from the plate end.

Studies have shown that when the fluid flows on a plane and the Reynolds number is more than 500000, the fluid is turbulent. When the fluid flows around an interferent and the Reynolds number is more than 5000, a turbulent flow can be formed (see Boundary Layer Theory, German, h. Schlichting, translated by Xu Yanhou, Science Press, February 1991). Therefore, in the present disclosure, an interferent is arranged between the sheet members so that the aerosol forms a flow around the interferent to facilitate the generation of a turbulent flow. Taking the flowing of gas at a velocity of 10 m/s among finned tubes having outer diameters of 65 mm with a base tube in an outer diameter of 25 mm as an example, if air flows between flat plates having the same size, and the Reynolds number is about 30000, so the air flow is laminar; whereas under the condition of finned tubes, in the presence of base tube, the air flows around the base tube, and the Reynolds number is about 13000, so the air flow is turbulent. Accordingly, it is more advantageous to form a turbulent flow by arranging an interferent between the sheet members.

"Turbulent fluctuation" refers to a phenomenon that there is an air flow component velocity perpendicular to the air flowing direction in the turbulent flow. According to the theory of aerosol mechanics, fine particulate matter are mainly diffused in the laminar flow by molecular thermal motion (Brownian motion) with weaker driving force, and the probability that fine particulate matter is settled to the outer surfaces of the sheet members is small. However, if the air flow forms a turbulent flow between the sheet members, the component velocity perpendicular to the air flowing direction can carry fine particulate matter to settle on the outer surfaces of the sheet members due to the turbulent fluctuation.

The intensity of the turbulent fluctuation of the air flow is usually characterized by the turbulence intensity, which is the ratio of the turbulent component velocity to the average velocity, with a calculation formula of $$I = 0.16 Re^{-\frac{1}{8}},$$

in which I is a turbulence intensity and Re is a Reynolds number. When the Reynolds number is 5000-20000, the corresponding turbulence intensity is 0.055-0.046.

In order to obtain high effect of removing fine particulate matter, the passage formed by adjacent sheet members should be long enough in the flowing direction of the air flow, and the spacing between the sheet members should be small enough. The longer the air flow stays in the passages, the better the settling effect of the fine particulate matter.

The formation of a water film on the outer surfaces of the sheet members is necessary for the implementation of the present disclosure. The air flow forms a viscous drag on the particulate matter in contact. The magnitude of the viscous drag is proportional to the square of the velocity and proportional to the square of the diameter of the particulate matter. When particulate matter with a diameter of 1 µm are settled on the dry wall, a viscous drag formed by the air velocity of 2 m/s or more is greater than the gravity of the fine particulate matter, and the fine particulate matter will be carried back into the air flow. Therefore, even if fine particulate matter is settled on the dry wall, they are easily carried by the passing air flow once more, so that the removal effect is not satisfactory. If a water film is formed on the wall, since the surface tension of water is about 0.07 N/m and will generate adsorption on the particulate matter infiltrated therein, in this case, it is assumed that half of the particulate matter with a diameter of 1 µm is infiltrated into the water, and the surface tension of the water is multiplied by the perimeter of the particulate matter, so in order to overcome the adsorption of the viscous drag, the air velocity required for carrying the particulate matter once more reaches 400 m/s. Considering that the air velocity in actual operation does not exceed 30 m/s, all fine particulate matter settled to the water film will be captured and removed. Therefore, whether the wall is wet has a great impact on the removal efficiency of the fine particulate matter.

The water film on the outer surfaces of the sheet members may be formed by condensation of water vapor in the aerosol, or formed by external spraying water or a water solution. If the water film is formed by condensation of water vapor in the aerosol, the temperature of the outer surfaces of the sheet members is required to be lower than the temperature of the aerosol. The higher the humidity of the aerosol, the smaller the temperature difference required to form the water film. Conversely, the lower the humidity of the aerosol, the larger the temperature difference required to form the water film. Generally, when the relative humidity of the aerosol is about 60%, the temperature difference required to form a condensed water film is at least 8 to 10° C. When the relative humidity of the aerosol is about 80%, the temperature difference required to form a condensed water film is at least 4-5° C. When the relative humidity of the aerosol is about 90%, only a temperature difference of 2° C. is required to form a condensed water film. The aerosol of the present disclosure is preferably the aerosol environment having a relatively high humidity (above 60%), more preferably a relative humidity exceeding 80%.

On the other hand, when there are temperature differences between the outer surfaces of the sheet members and the air flow, a temperature gradient is formed between the outer surfaces of the sheet members and the air flow, and a thermophoretic force for driving particulate matter in the air flow to move toward the cold wall is thus formed. The higher the temperature gradient, the greater the thermophoretic force.

A thermophoretic effect means that when particulate matter moves in a fluid having a temperature gradient, since the momentums transferred when molecules in hot and cold zones collide with the particulate matter are different, the particulate matter is generally subjected to a force opposite to the direction of the temperature gradient (i.e., a thermophoretic force) and move at a speed opposite to the temperature gradient to settle on a low-temperature surface. Since the temperature gradient exists in the boundary layer of the cold wall, the thermophoretic effect is a short-range effect that occurs only in the boundary layer of the wall.

The calculation formula of the thermophoretic force (see *Aerosol Mechanics*, Science Press, 1960) is $$F = -\frac{9\pi \cdot Xa \cdot \eta^2 \cdot R \cdot \Gamma a}{(Xa + Xi) \cdot \rho \cdot T},$$

in which F is a thermophoretic force, Xa is a thermal conductivity of gas, Xi is a thermal conductivity of particulate matter, η is a viscosity coefficient of gas, R is the radii of particulate matter, Γa is a temperature gradient, p is the density of gas, and T is the temperature of gas. Since the temperature gradient exists in the boundary layer, the larger the temperature difference, the thinner the boundary layer and the larger the temperature gradient.

According to the theory of fluid mechanics, the calculation formula of the viscous drag is $$F = \frac{\xi \pi R^2 \rho U^2}{2},$$

in which F is a viscous drag, ξ is a drag coefficient, ηR2 is the projected area of particulate matter, ρ is the density of gas, and U is the velocity of gas.

According to the calculation formula of the thermophoretic force, the magnitude of the thermophoretic force is proportional to the temperature gradient and proportional to the first power of the diameter of the particulate matter, and the magnitude of the viscous drag is proportional to the square of the diameter of the particulate matter, so under the same condition, the smaller the diameter of the particulate matter, the larger the ratio of the thermophoretic force to the viscous drag and the more obvious the effect of achieving settlement using the thermophoretic force. Therefore, the method of the present disclosure has higher removal efficiency for sub-micron particulate matter with a smaller diameter in the aerosol, and can achieve very high removal efficiency of particulate matter number concentration.

A boundary layer is a flowing thin layer that is not negligible in viscous force close to an object plane in a high Reynolds number flow, and is also referred to as a flow boundary layer or an adherent layer. The temperature gradient and the velocity gradient are generally considered to mainly exist in the boundary layer, and the fluid flow above the boundary layer can be regarded to be at the same temperature and the same velocity. The formula for calculating the thickness of the boundary layer is $$\theta = 5L \cdot Re^{-\frac{1}{2}},$$

in which θ is the thickness of the boundary layer, L is a characteristic length, and Re is a Reynolds number. The larger the Reynolds number is, the thinner the boundary layer is. When the fluid flows through a flat plate, the term "characteristic length" is the distance of flowing backward from the plate end.

On another hand, when the aerosol has a high humidity, for example, is saturated (or nearly saturated) or supersaturated, after the aerosol condenses on the outer surfaces of the sheet members to form a water film, a vapor pressure gradient difference is produced between the outer surfaces of the sheet members and the aerosol, and fine particulate matter will be subjected to a vapor pressure gradient force directed to the outer surfaces of the sheet members, which can drive the fine particulate matter to settle on the outer surfaces of the sheet members.

The term "vapor pressure gradient force" should be understood as when moisture in high-humidity gas condenses, a vapor pressure gradient is caused between the air flow and the condensation wall, and a gas molecular flow directed to the condensation wall is formed, causing different collision between the gas and the molecules on two opposite sides of the particulate matter therein and causing migration of the particulate matter moving in a direction toward the condensation wall. Like the thermophoretic force, the vapor pressure gradient force is also a micro force, and the vapor pressure gradient is mainly present in the boundary layer of the cold wall. The vapor pressure gradient force is complicated in calculation, and can be regarded as a value between two calculated values: a pressure gradient force generated when the partial pressure of other gas components is not considered and only the vapor pressure gradient exists, and a Stephen flow driving force generated when the total vapor pressure is unchanged but the partial pressure of the water vapor changes. Briefly, the vapor pressure gradient force is proportional to the vapor pressure gradient and proportional to the cube of the diameter of the particulate matter. The greater the relative humidity of gas, the smaller the thickness of the boundary layer, and the greater the vapor pressure gradient. To use the vapor pressure gradient force, the relative humidity of the gas itself is required to be high (preferably near saturation, saturation or supersaturation).

When conditions are satisfied, the vapor pressure gradient force can be superimposed with the thermophoretic force to jointly drive the fine particulate matter to settle on the outer surfaces of the sheet members. At this time, while the turbulent fluctuation strengthens its settlement, the fine particulate matter in the aerosol overcomes the viscous drag under the action of the thermophoretic force and the vapor pressure gradient force and are settled onto the outer surfaces of the sheet members. The water film formed on the outer surfaces of the sheet members ensures that the settled fine particulate matter is not carried away by the air flow once more.

The above factors (turbulent fluctuation, thermophoretic force, vapor pressure gradient force) can promote the settlement of fine particulate matter onto the outer surfaces of the sheet members, and at the same time cause a difference in velocity of particulate matter in the aerosol having different diameters to promote the collision between the particulate matter, both resulting in a decrease in the number concentration of fine particulate matter in the aerosol.

The fine particulate matter capture device of the present disclosure includes at least two, i.e., two or more, e.g., three, four, five or more, sheet members. The plurality of sheet members can increase the amount of fine particulate matter settled onto the outer surfaces thereof by increasing the area of the outer surface in contact with the air flow.

The "sheet member" of the present disclosure refers to a member that is substantially sheet-like, and the outer surface of the member may have certain radian or angle, as long as it is sheet-like on the whole. For example, in order to stabilize the whole fine particulate matter capture device, the sheet member may be thick at the junction with the interferent and thin at the free end away from the interferent.

When the device of the present disclosure is used to capture fine particulate matter in aerosols, the device is positioned such that the parallel members are substantially parallel to the air flow.

Being "substantially parallel" in the present disclosure does not exclude where certain radian or relative angle exists on the mutually parallel lines and/or planes, but only requiring that the distances between them are roughly the same. Generally, being "substantially parallel" includes a completely parallel state and an incompletely but substantially parallel state wherein the desired effect can be substantially achieved. Specifically, being "substantially parallel" includes a completely parallel state between a line and a plane or between planes, and a state where they change from a completely parallel state to a relative movement of 0-10°.

In order to achieve the effect of removing fine particulate matter, the sheet members should be long enough in the flowing direction of the air flow, so that the air flow stays long enough time on the sheet members. The lengths of the sheet members in the flowing direction of the air flow are preferably at least 45 mm, more preferably at least 60 mm. The spacing between adjacent sheet members should be small enough to increase the probability of movement of particulate matter between the large sheet members to the surfaces of the sheet members for the same period of time. The spacing between adjacent sheet members is preferably 15 mm or less, more preferably 8 mm or less. In order that a large amount of fine particulate matter is settled onto the outer surfaces of the sheet members within the time when the air flow flows through the passage, the ratio of the spacing between adjacent sheet members to the length of the sheet members in the flowing direction of the air flow is less than 4 times the turbulence intensity, more preferably less than 2 times the turbulence intensity. Further preferably, the ratio of the spacing between adjacent sheet members to the length of the sheet members in the flowing direction of the air flow is less than 0.22, 0.184, 0.11 or 0.092. The spacing between adjacent sheet members may be a spacing between the centerlines of adjacent sheet members, or between adjacent outer surfaces of adjacent sheet members, e.g., a distance between the lower surface of the upper sheet member and the upper surface of the lower sheet member (when the sheet members are placed adjacently up and down), or a distance between the rear surface of the front sheet member and the front surface of the rear sheet member (when the sheet members are placed adjacently front and back).

In order to form a turbulent flow when the aerosol flows through the passages between the sheet members, an interferent is arranged between the sheet members. The interferent may penetrate through all the sheet members, preferably vertically penetrate through all sheet members. The interferent may be in any suitable shape.

In a preferred embodiment, the interferent is a hollow tube penetrating through the sheet members, and a coolant (e.g., water, Freon, methanol, ethanol, acetone, ammonia water, etc.) is introduced into the tube to maintain a temperature difference between the outer surfaces of the sheet members and the aerosol.

In another preferred embodiment, the interferent is a heat-conducting solid tube penetrating through the sheet members, the solid tube is connected to an external cold source, and the temperature difference between the sheet members and the aerosol is formed through heat conduction.

Since the thermal conductivity of metal is higher than that of nonmetal, in order to ensure a large temperature difference to facilitate the realization of the thermophoretic effect, the fine particulate matter capture device is preferably made of a metal material such as one of or a compound made from two or more of aluminum, copper and steel.

In order to further prolong the service life of the metal members, the metal members may also be specially treated for corrosion protection. For example, the metal members of steel, copper or aluminum are coated with an anti-corrosive material or passivated.

In another preferred embodiment, the sheet members are semiconductor thermoelectric sheets, and the fine particulate matter capture device includes two semiconductor thermoelectric sheets having opposite cold ends and an interferent between the thermoelectric sheets. As shown in FIG. 2, the fine particulate matter capture device includes an upper semiconductor thermoelectric sheet 7 and a lower semiconductor thermoelectric sheet 10. After direct current power is connected to the upper semiconductor thermoelectric sheet 7 by using an upper power supply 6, an upper hot end 9 and an upper cold end 8 are formed. After direct current power is connected to the lower semiconductor thermoelectric sheet 10 by using a lower power supply 13, a lower hot end 12 and a lower cold end 11 are formed. A passage is formed between the upper cold end 8 and the lower cold end 11, an interferent 3 is provided, and the aerosol forms a turbulent flow in the passage.

The term "semiconductor thermoelectric sheet" is also called a semiconductor refrigeration sheet. It is a refrigeration technology based on the Peltier effect. It has a simple working principle that: when an N-type semiconductor material and a P-type semiconductor material are connected into a galvanic coupling, after a direct current is connected to this circuit, energy can be transferred, the connector where the current flows from the N-type member to the P-type member absorbs heat to form a cold end, and the connector where the current flows from the P-type member to the N-type member releases heat to form a hot end. The temperature difference between the cold and hot ends of the semiconductor refrigeration sheets can reach 40 to 65° C. If the temperature of the hot end is lowered by active heat dissipation, the temperature of the cold end drops correspondingly to thereby achieve a lower temperature. When the two semiconductor thermoelectric sheets having opposite cold ends are in operation, the aerosol is caused to flow through the passage between the cold ends of the two semiconductor thermoelectric sheets, and the aerosol contacts the cold ends and forms a temperature difference with the cold ends.

Other methods of forming a temperature difference between the outer surfaces of the sheet members and the aerosol are already known to those skilled in the art.

In the method for removing fine particulate matter from an aerosol according to the present disclosure, when the gas volume is large, a plurality of fine particulate matter capture devices (also referred to as a set of fine particulate matter capture devices, wherein the plurality of fine particulate matter capture devices are spaced from each other by an appropriate distance) may be arranged in parallel on a cross section of the flowing direction of the aerosol, as shown in FIG. 3. Considering that the capture effect of a set of fine particulate matter capture devices is limited, a plurality of sets of fine particulate matter capture devices may be arranged in the flowing direction of the aerosol, each set of fine particulate matter capture devices is located on a cross section of the flowing direction of the aerosol, and two adjacent sets of fine particulate matter capture devices may be arranged sequentially or staggered (as shown in FIG. 4) to strengthen the turbulence of flue gas.

When a plurality of fine particulate matter capture devices are used, the Reynolds number, the turbulence intensity, the thickness of the boundary layer, the thermophoretic force and the viscous drag are separately calculated for each fine particulate matter capture device.

In a particularly preferred embodiment, the fine particulate matter capture device is a finned tube heat exchanger, as shown in FIG. 5. The fins of the finned tube heat exchanger are the sheet members, and the outer diameter D of the fins corresponds to the length of the sheet member. The base tube of the heat exchanger constitutes the interferent. For ease of measurement and calculation, when a finned tube heat exchanger is used, the fin pitch can be used to represent the spacing between the outer surfaces of the sheet members. The fin pitch t is preferably less than 15 mm, more preferably less than 8 mm. The fin height h is preferably more than 10 mm, more preferably more than 18 mm. The ratio of the fin pitch t to the fin outer diameter D is less than 4 times the turbulence intensity, more preferably less than 2 times the turbulence intensity.

The "finned tube heat exchanger" is well known to those skilled in the art. Finned tube, also known as fin tube, is usually a combination of a base tube and fins added on the surface thereof, so that the surface of the base tube is expanded, and the fluids inside and outside the tube exchange heat through the tube wall or the fins. Since the fins enlarge the heat transfer area, the heat exchange efficiency is improved. The base tube is usually a circular tube or a flat tube or an elliptical tube. The fins may be in any suitable shape, and the fins may be mounted on the inner and/or outer side of the tube, depending on the application of the heat exchanger and the specific type of the fluid inside and outside the base tube of the heat exchanger. A coolant may be introduced into the base tube of the finned tube heat exchanger, the aerosol flows between the fins outside the tube, and the heat of the aerosol is transferred to the coolant inside the tube through the fins and the tube wall, so that heat exchange is realized inside and outside the finned tubes.

More preferably, in the present disclosure, the finned tube heat exchanger used is a finned heat pipe heat exchanger. The "heat pipe" is also referred to as a "closed two-phase heat transfer system", that is, a device for transferring heat by means of phase changes (from a liquid phase to a vapor phase and from a vapor phase to a liquid phase) of a fluid in a closed system. The heat pipe transfers heat by means of the phase change of a working medium and thus has excellent heat transfer characteristic. The equivalent thermal conductivity of the heat pipe is several tens or even a hundred times higher than that of copper or aluminum, and thus the heat pipe is called a superconductor. Compared with a common finned tube heat exchanger having identical dimensions, the heat pipe has good axial isothermality so that it can form a larger heat transfer temperature difference when the same power is transferred. A typical heat pipe heat exchanger consists of a shell, a wick and an end cover. After the pipe is pumped to a certain negative pressure, it is filled with an appropriate amount of working liquid, and the capillary porous material of the wick close to the inner wall of the pipe is filled with liquid and then sealed. One end of the pipe is an evaporation section (heating section), the other end is a condensation section (cooling section), and an adiabatic section may be arranged between the two sections according to application needs. When one end of the heat pipe is heated, the liquid in the capillary wick is vaporized, the vapor flows to the other end under a slight pressure difference to release heat and is condensed into liquid, and the liquid flows back to the evaporation section with the capillary force along the porous material. This cycle allows heat to be transferred from one end of the heat pipe to the other end thereof. In the present disclosure, a separate heat pipe heat exchanger is preferred.

The water film on the outer surfaces of the sheet members may be formed by condensation of water vapor in the aerosol. If the water film is to be formed by condensation of water vapor in the aerosol, the temperature of the outer surfaces of the sheet members is required to be lower than the temperature of the aerosol. With a higher humidity of the aerosol, the temperature difference required to form the water film is smaller. Conversely, with a lower humidity of the aerosol, the temperature difference required to form the water film is larger. Generally, when the humidity of the aerosol is about 60%, the temperature difference required to form a water film is at least 8 to 10° C. When the humidity of the aerosol is about 80%, the temperature difference required to form a water film is at least 4-5° C. When the humidity of the aerosol is about 90%, only a temperature difference of 2° C. is required to form a water film.

The water film on the outer surfaces of the sheet members may also be formed by externally spraying water or a water solution. As shown in FIG. 6, a spray device may be arranged on one side of the fine particulate matter capture device to spray water or a water solution onto the outer surface of the fine particulate matter capture device to maintain its wetness so as to ensure that a sufficient water film can be formed, and to flush the outer surfaces of the sheet members to prevent scaling on the wall. In some embodiments, spray devices may be arranged on both sides of the fine particulate matter capture device.

Figures 7, 8:
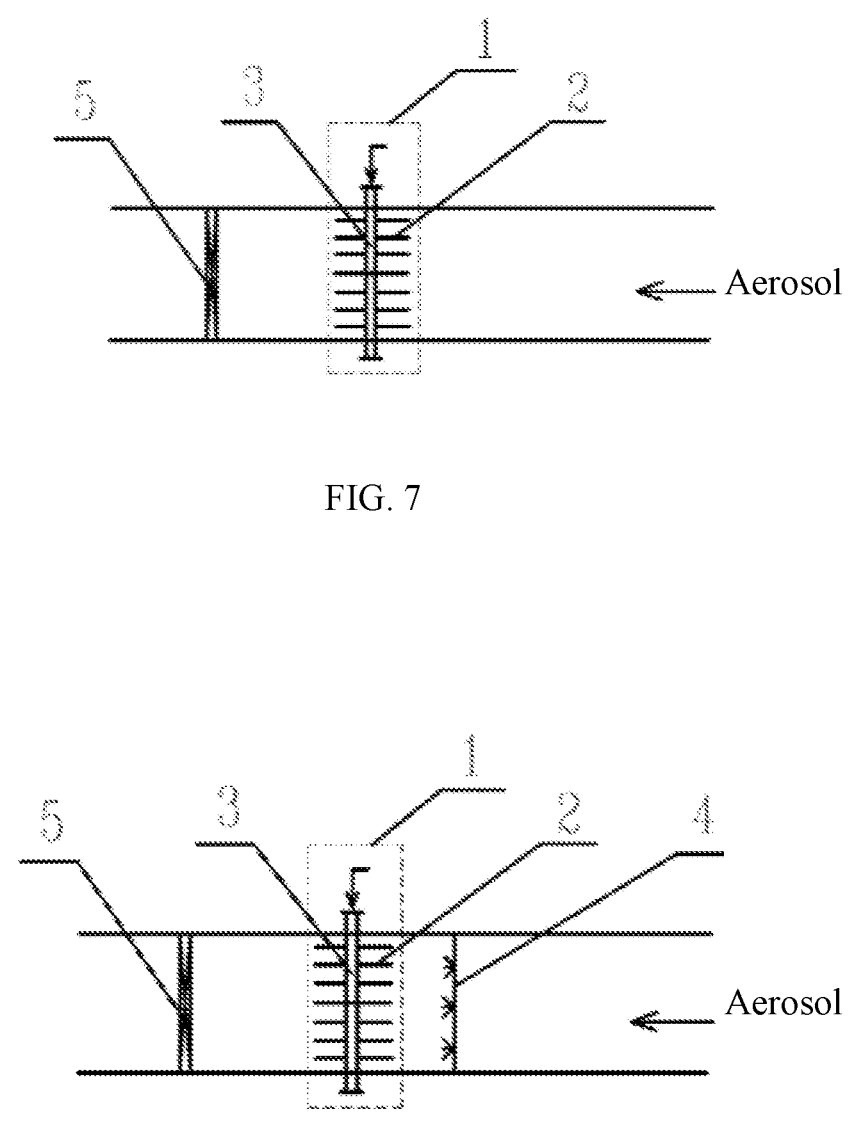

After the aerosol passes through the fine particulate matter capture device, the escaped particulate matter absorbs moisture as condensation nucleus and then grows. Therefore, in some embodiments, another particulate matter capture device such as a mist eliminator or a wet dust collector may be provided following the fine particulate matter capture device to capture the grown droplets once more, as shown in FIG. 7. The wet dust collector may be, for example, a wet electrostatic dust collector or a venturi dust collector.

In some embodiments, a spay device may be arranged on one or two sides of the fine particulate matter capture device, and another particulate matter capture device is provided following the fine particulate matter capture device, as shown in FIG. 8.

In the present disclosure, the velocity of the aerosol is preferably 2 to 20 m/s.

The aerosol described in the present disclosure may be, for example, net flue gas after desulfurization of a coal-fired boiler, high-humidity flue gas after combustion of natural gas, high-humidity exhaust gas discharged from a timber treating plant, air containing haze, etc. The aerosol of the present disclosure includes, but is not limited to, high-humidity flue gas, particularly high-humidity flue gas treated by wet desulfurization.

If the relative humidity of the aerosol is not high enough to quickly form condensed vapor in the heat exchanger, the moisture content thereof can be improved by pretreatment (adding vapor, pre-cooling, spraying water, etc.), and then the aerosol passes through the fine particulate matter capture device. For example, a nozzle may be added before the fine particulate matter capture device to spray vapor or water so as to humidify the aerosol, or a preheat exchanger is added before the fine particulate matter capture device to pre-cool the aerosol so as to improve the relative humidity of the aerosol. The preheat exchanger may be any form of heat exchanger, such as a common optical pipe heat exchanger.

"Fine particulate matter" used in the present disclosure refers to solid particulate matter or droplets having aerodynamic equivalent diameters less than or equal to 2.5 μm (PM2.5) in the ambient air. "Sub-micron particulate matter" used in the present disclosure refers to solid particulate matter or droplets having aerodynamic equivalent diameters less than or equal to 1 μm (PM1) in the ambient air.

Embodiment 1

Flue gas generated by a 300 MW coal-fired boiler becomes nearly saturated wet flue gas (with a relative humidity above 95%) after wet desulfurization, with a volume of 1.2 million m3/h and a temperature cooled to about 45 to 50° C., and the flue gas contains 30 mg/Nm3 of particulate matter with a particle size distribution mainly between 0.2 and 1 μm, which is mainly dust and condensable particulate matter, so the flue gas is a typical high-humidity aerosol.

A plurality of sets of fine particulate matter capture devices are arranged in a net flue connected to a desulfurization tower and in the form of metal finned tube heat exchangers with the coolant being water, wherein the finned tubes are made of a metal composite material, the fin pitch is 5 mm, the fin height is 20 mm, the outer diameter of the finned tubes is 65 mm, and the temperature difference between the wet flue gas and fins is 5° C. or more.

Spray devices are arranged on two sides of the fine particulate matter capture devices to spray a water solution.

The finned tube heat exchangers carry away part of the heat in the wet flue gas to achieve cooling condensation of the wet flue gas, the fine particulate matter in the wet flue gas is settled to the outer surfaces of the finned tubes under the drive of turbulent fluctuation, thermophoretic force and vapor pressure gradient force, and the removal efficiency is 70% or more by number concentration.

The high-humidity flue gas enters into a vapor supersaturation state after cooling, a large amount of water vapor successively condenses out, preferentially condenses on the escaping particulate matter in the wet flue gas to promote the growth of the particulate matter, and the droplet particulate matter finally has a diameter of 15 to 20 μm or more by collision and condensation.

A horizontal flue mist eliminator is provided following the fine particulate matter capture devices, and most of the droplets exceeding 15 μm are removed by the mist eliminator, thereby ensuring that the concentration of dust is less than 3 mg/Nm3 and the escape concentration of the droplets is less than 20 mg/Nm3.

Embodiment 2

Flue gas generated by a 30 t coal-fired boiler becomes saturated wet flue gas after wet desulfurization, with a volume of 40000 m3/h and a temperature cooled to about 45 to 50° C., and the flue gas contains 30 mg/Nm3 of particulate matter with a maximum concentration particle size of 1 μm, which is mainly dust and condensable particulate matter.

A plurality of sets of fine particulate matter capture devices are arranged in a net flue connected to a desulfurization tower and in the form of finned heat pipe heat exchangers, wherein the side with the saturated wet flue gas is an evaporation section, the side with the ambient air is a condensation section, the heat pipe working fluid is Freon 134A, the finned tube on the evaporation section is a rolled metal composite material, the fin pitch is 5 mm, the fin height is 20 mm, the outer diameter of the finned tubes is 65 mm, and the temperature difference between the fins and the flue gas is 5° C. or more.

Spray devices are arranged on two sides of the condensation section (in the net flue) to spray a water solution.

The heat pipe heat exchangers carry away part of the heat in the wet flue gas to cool the wet flue gas and make them condensate as fine particles, then the fine particulate matter in the wet flue gas are settled to the outer surfaces of the finned tubes under the drive of turbulent fluctuation, thermophoretic force and vapor pressure gradient force. The removal efficiency is 70% or more by number concentration.

The saturated wet flue gas enters into a vapor supersaturation state after cooling, a large amount of water vapor successively condenses out, preferentially condenses on the escaping particulate matter in the wet flue gas to promote the growth of the particulate matter, and the droplet particulate matter finally has a diameter of 15 to 20 μm or more by collision and condensation.

A horizontal flue mist eliminator is provided following the fine particulate matter capture devices, and most of the droplets exceeding 15 μm are removed by the mist eliminator, thereby ensuring that the concentration of dust is less than 3 mg/Nm3 and the escape concentration of the droplets is less than 20 mg/Nm3.

Embodiment 3

Burnt flue gas emitted from a gas-fired boiler is nearly saturated wet flue gas (with a relative humidity above 90%)

at a temperature of about 80° C., containing NOx in 100 mg/Nm3, along with condensable particulate matter (mainly nitrate) and heavy metal particulate matter in a diameter range of 0.2 to 1 μm. Although the mass concentration does not exceed 10 mg/Nm3, the number concentration is huge.

A fine particulate matter capture device is arranged in the flue and in the form of a common finned tube heat exchanger, the wet flue gas side is an endothermic section, the ambient air side is a heat dissipation section, and the heat pipe working medium is water. The evaporation section is rolled metal composite finned tubes, the fin pitch is 5 mm, the fin height is 15 mm, the outer diameter of finned tubes is 55 mm, and the temperature difference between the fins and the flue gas is 10° C. or more.

The heat exchanger carries away part of the heat in the wet flue gas to achieve cooling condensation of the wet flue gas, and the removal efficiency of fine particulate matter in the wet flue gas is 70% or more by number concentration.

The wet flue gas enters into a vapor supersaturation state after cooling, a large amount of water vapor successively condenses out, preferentially condenses on the escaping particulate matter in the wet flue gas to promote the growth of the particulate matter, and the droplet particulate matter finally has a diameter of 15 to 20 μm or more by collision and condensation.

In addition, the condensed water can absorb NOx in the flue gas, especially NO2, and therefore has certain denitration capability.

Spray devices are also arranged on two sides of the fine particulate matter capture device, the spray water is common process water added with an appropriate amount of Na2CO3 or NaOH to flush the finned tubes and maintain the water films on the surfaces of the finned tubes and can improve the alkalinity of the condensed water to facilitate absorption on NOx.

A horizontal flue mist eliminator is provided following the fine particulate matter capture device, and most of the droplets exceeding 15 μm are removed by the mist eliminator, thereby ensuring that the escape concentration of the droplets is less than 20 mg/Nm3.

Embodiment 4

In a timber processing plant, the exhaust gas contains a large amount of water vapor, the temperature of the exhaust gas is 50 to 60° C., the concentration of organic acids is 30 mg/Nm3, the dust is about 33 mg/Nm3, and the organic carbon is 43 mg/Nm3. The local environmental protection requires the emission of dust (including organic carbon) to be reduced to 15 mg/Nm3. Under this working condition, the conventional bag-type dust collectors and electrostatic dust collectors are difficult to apply.

A fine particulate matter capture device is arranged in the flue between the outlet of the plant and the chimney and in the form of a heat pipe heat exchanger, wherein the wet flue gas side is an endothermic section, the ambient air side is a heat dissipation section, and the heat pipe working medium is Freon 134A. The evaporation section is rolled metal composite finned tubes, the fin pitch is 5 mm, the fin height is 15 mm, the outer diameter of the finned tubes is 55 mm, and the temperature difference between the fins and the flue gas is 5° C. or more.

A spray device is arranged on one side of the evaporation section of the heat pipe heat exchanger to spray a water solution.

The heat exchanger carries away part of the heat in the high-humidity exhaust gas to cool the high-humidity exhaust gas, and the removal efficiency of fine particulate matter in the high-humidity exhaust gas is 60% or more (by number concentration).

The exhaust gas enters into a vapor supersaturation state after cooling, a large amount of water vapor successively condenses out, preferentially condenses on the escaping particulate matter in the wet flue gas to promote the growth of the particulate matter, and the droplet particulate matter finally has a diameter of 15 to 20 μm or more by collision and condensation.

A horizontal flue mist eliminator is provided following the fine particulate matter capture device, and most of the droplets exceeding 15 μm are removed by the mist eliminator, thereby ensuring that the concentration of dust is less than 10 mg/Nm3 and the escape concentration of the droplets is less than 20 mg/Nm3.

It should be understood that the above-mentioned specific embodiments of the present disclosure are merely used for illustrating or interpreting the principle of the present disclosure, rather than limiting the present disclosure. Any modification, equivalent substitution or improvement made without departing from the spirit and scope of the present disclosure shall fall into the protection scope of the present disclosure. Moreover, the appended claims are intended to cover all variations and modifications falling within the scope and boundary of the appended claims or within the equivalent forms of such scope and boundary.

The invention claimed is:

1. A method for removing fine particulate matter from an aerosol, comprising:
    passing an aerosol through a fine particulate matter capture device which comprises at least two sheet members and an interferent between the sheet members, the sheet members being substantially parallel to each other and substantially parallel to the flowing direction of the aerosol, and adjacent sheet members of the sheet members forming a passage therebetween to cause the aerosol to form a turbulent flow in the passage and to form a boundary layer on outer surfaces of the sheet members; wherein the outer surfaces of the sheet members is a surface in contact with the aerosol;
    making temperature of outer surfaces of the sheet members 2° C. or more below temperature of the aerosol, thereby causing the formation of thermophoretic force and vapor pressure gradient force in the boundary layer on the outer surfaces of the sheet members which drive the fine particulate matter to move to the outer surfaces of the sheet members, and causing the moisture in the aerosol to condense on the outer surfaces of the sheet members to form a water film, so that the fine particulate matter settles on the outer surfaces of the sheet members and is removed with flowing of the water film,
    wherein relative humidity of the aerosol is 60% or more.

2. The method of claim 1, wherein a ratio of a spacing between the adjacent sheet members to a length of the sheet members in the flowing direction of the aerosol is less than 4 times a turbulence intensity.

3. The method of claim 1, wherein the fine particulate matter capture device is a finned tube heat exchanger, fins on the heat exchanger constitute the sheet members, and a base tube of the heat exchanger constitutes the interferent; a coolant flows within the base tube of the heat exchanger to maintain the temperature difference between the outer surfaces of the sheet members and the aerosol.

4. The method of claim 3, wherein the fine particulate matter capture device is made of a metal material.

5. The method of claim 4, wherein metal members made of steel, copper or aluminum in the fine particulate matter capture device are coated with an anti-corrosive material or passivated.

6. The method of claim 5, wherein the ratio of a spacing between the adjacent sheet members to a length of the sheet members in the flowing direction of the aerosol is less than 4 times a turbulence intensity, the relative humidity of the aerosol is 60% or more, the temperature of the outer surfaces of the sheet members is 2° C. or more below a temperature of the aerosol, the velocity of the aerosol between the sheet members is 2-20 m/s.

7. The method of claim 6, wherein water or a water solution is sprayed onto the outer surfaces of the sheet members to form a water film on the outer surfaces of the sheet members.

8. The method of claim 1, wherein a velocity of the aerosol between the sheet members is 2-20 m/s.

9. A system for removing fine particulate matter from an aerosol, comprising
an air flow passage for an aerosol to flow, wherein a fine particulate matter capture device is provided in the air flow passage,
the fine particulate matter capture device comprises at least two sheet members and an interferent between the sheet members, and the sheet members are substantially parallel to each other and substantially parallel to the direction of air flow,
wherein the fine particulate matter capture device is a finned tube heat exchanger, fins on the heat exchanger constitute the sheet members, and a base tube of the heat exchanger constitutes the interferent; a coolant flows through the base tube to maintain a temperature difference between outer surfaces of the sheet members and the aerosol.

10. The system of claim 9, wherein a ratio of a spacing between adjacent sheet members of the sheet members to a length of the sheet members in the flowing direction of the aerosol is less than 4 times a turbulence intensity.

11. The system of claim 9, wherein the fine particulate matter capture device is made of a metal material.

12. The system of claim 11, wherein the metal members of steel, copper or aluminum in the fine particulate matter capture device are coated with an anti-corrosive material or passivated.

13. The system of claim 12, wherein the ratio of a spacing between the adjacent sheet members to a length of the sheet members in the flowing direction of the aerosol is less than 4 times a turbulence intensity.

14. The system of claim 13, wherein a spray device is provided on one or two sides of the fine particulate matter capture device to spray water or a water solution onto the outer surfaces of the sheet members.

15. The system of claim 9, wherein a spray device is provided on one or two sides of the fine particulate matter capture device to spray water or a water solution onto the outer surfaces of the sheet members.

* * * * *